US012028754B2

(12) United States Patent
Jarschel et al.

(10) Patent No.: US 12,028,754 B2
(45) Date of Patent: Jul. 2, 2024

(54) METHOD, APPARATUS AND COMPUTER PROGRAM PRODUCT FOR MANAGEMENT OF MOBILE ENTITIES

(71) Applicant: NOKIA TECHNOLOGIES OY, Espoo (FI)

(72) Inventors: Michael Jarschel, Oberhaching (DE); Andreas Maeder, Würzburg (DE)

(73) Assignee: Nokia Technologies Oy, Espoo (FI)

( * ) Notice: Subject to any disclaimer, the term of this patent is extended or adjusted under 35 U.S.C. 154(b) by 311 days.

(21) Appl. No.: 17/426,388

(22) PCT Filed: Jan. 31, 2019

(86) PCT No.: PCT/EP2019/052385
§ 371 (c)(1),
(2) Date: Jul. 28, 2021

(87) PCT Pub. No.: WO2020/156673
PCT Pub. Date: Aug. 6, 2020

(65) Prior Publication Data
US 2022/0104077 A1 Mar. 31, 2022

(51) Int. Cl.
*H04W 36/00* (2009.01)
*H04L 67/10* (2022.01)
*H04W 36/12* (2009.01)

(52) U.S. Cl.
CPC ......... *H04W 36/0016* (2013.01); *H04L 67/10* (2013.01); *H04W 36/00837* (2018.08); *H04W 36/12* (2013.01)

(58) Field of Classification Search
CPC . H04W 80/04; H04W 36/18; H04W 36/0011; H04W 36/14; H04W 36/08;
(Continued)

(56) References Cited

U.S. PATENT DOCUMENTS 7,398,088 B2 * 7/2008 Belkin ............... H04W 36/0066
455/442
11,622,307 B2 * 4/2023 Hassan Hussein ..................
H04B 7/18541
370/331
(Continued)

FOREIGN PATENT DOCUMENTS

FI WO 2019/011408 A1 * 7/2017 ............ H04W 36/00
JP WO 2018/224470 A1 * 12/2018 ............. H04W 4/02
(Continued)

OTHER PUBLICATIONS

ETSI GS MEC 002, v2.1.1 (Oct. 2018), Multi-access Edge Computing (MEC); Phase 2: Use Cases and Requirements. (Year: 2018).*
(Continued)

*Primary Examiner* — Peter G Solinsky
*Assistant Examiner* — Sanjay K Dewan
(74) *Attorney, Agent, or Firm* — Barta Jones, PLLC

(57) ABSTRACT

The invention relates to apparatuses, methods and computer program products for management of non-stationary mobile edge communication hosts. In accordance of an embodiment, the apparatus comprises means for wirelessly communicating with a non-stationary mobile edge computing element capable of providing mobile edge application services to wireless communication equipment; means for querying whether the non-stationary mobile edge computing element is available for mobile edge computing; and means for maintaining information of the availability of the non-stationary mobile edge computing element for mobile edge computing; and maintaining information on mobile edge application instances the available non-stationary mobile edge computing element is providing.

14 Claims, 8 Drawing Sheets

(58) Field of Classification Search
CPC ....... H04W 36/0016; H04W 36/00837; H04W 36/12; H04L 67/10
USPC ........................................................ 370/331
See application file for complete search history.

(56) References Cited

U.S. PATENT DOCUMENTS

| | | | | |
|---|---|---|---|---|
| 11,700,563 | B2* | 7/2023 | Ramaswamy | H04W 36/0033 370/331 |
| 11,700,628 | B2* | 7/2023 | Sabella | H04L 41/0895 370/331 |
| 11,729,692 | B2* | 8/2023 | Tran | H04W 36/32 370/331 |
| 11,770,745 | B2* | 9/2023 | Hoole | H04L 5/0055 370/337 |
| 2018/0183855 | A1* | 6/2018 | Sabella | H04L 67/04 |
| 2020/0244722 | A1* | 7/2020 | Jeuk | H04L 67/1021 |
| 2020/0404069 | A1* | 12/2020 | Li | H04L 67/59 |
| 2022/0038554 | A1* | 2/2022 | Merwaday | H04L 45/64 |
| 2022/0086218 | A1* | 3/2022 | Sabella | H04M 15/66 |
| 2023/0102852 | A1* | 3/2023 | Andrae | G06F 9/5088 370/331 |

FOREIGN PATENT DOCUMENTS

| | | |
|---|---|---|
| WO | WO 2018/224470 A1 | 12/2018 |
| WO | WO 2019/011408 A1 | 1/2019 |
| WO | WO 2019/236755 A1 * | 12/2019 ............ H04W 88/18 |

OTHER PUBLICATIONS

Draft ETSI GS MEC 003 v2.0.7 (Dec. 2018), Multi-access Edge Computing (MEC); Framework and Reference Architecture. (Year: 2018).*

International Search Report and Written Opinion dated Nov. 11, 2019 corresponding to International Patent Application No. PCT/EP2019/052385.

Draft ETSI GS MEC 003 V2.0.7 (Dec. 2018), ETSI Group Specification, "Multi-access Edge Computing (MEC); Framework and Reference Architecture," ETSI Draft Specification; Dec. 12, 2018, pp. 1-21, XP014332647.

ETSI GS MEC 002 V2.1.1 (Oct. 2018), ETSI Group Specification, "Multi-access Edge Computing (MEC); Phase 2: Use Cases and Requirements," ETSI, Oct. 31, 2018, XP055637899.

* cited by examiner

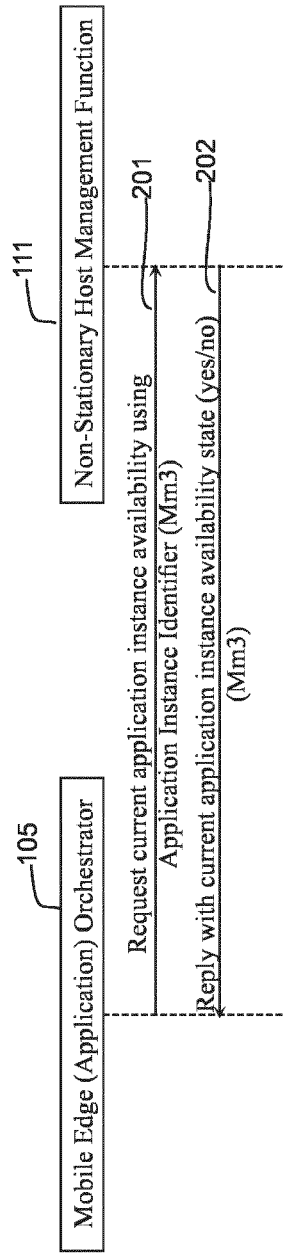
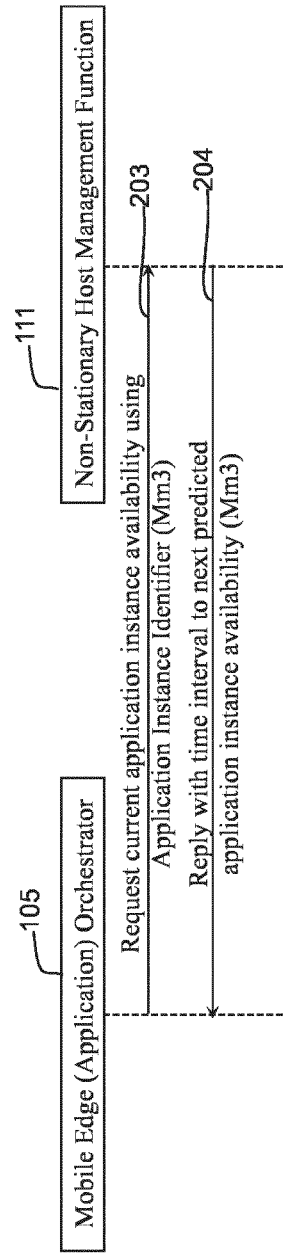
Fig. 2a
Fig. 2b

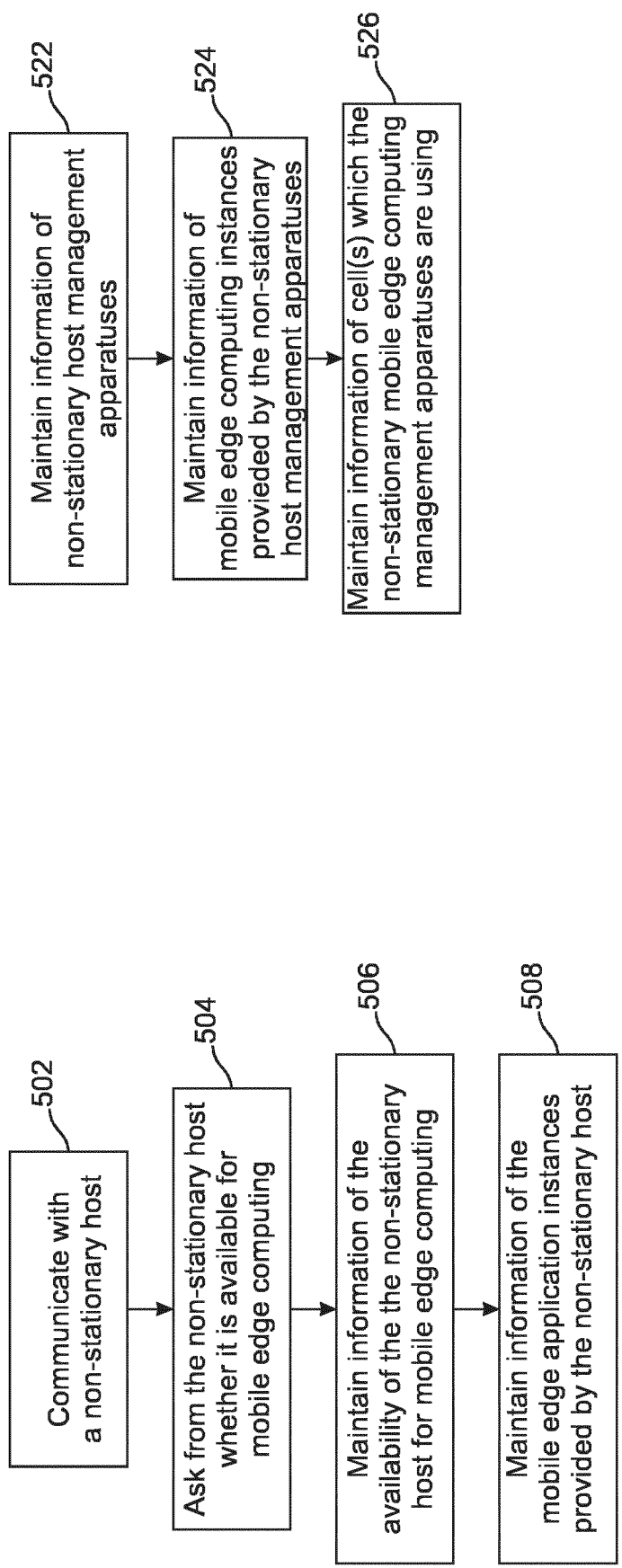

METHOD, APPARATUS AND COMPUTER PROGRAM PRODUCT FOR MANAGEMENT OF MOBILE ENTITIES

TECHNICAL FIELD

The present invention relates to an apparatus, a method and a computer program for mobile edge computing.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Mobile edge computing (MEC, a.k.a. Multi-Access Edge Computing) refers to a concept in which cloud computing operations and/or possibly other software related operations, which have been performed by a server in a network, are implemented within a radio access network (RAN), for example at an interface between a mobile communication network and a mobile communication device utilizing such operations. Mobile edge computing may allow that content, services and applications could be performed faster and responsiveness from the edge could be increased, wherein a latency may also become smaller. Inter alia the European Telecommunication Standards Institute (ETSI) is developing standards for mobile edge communication.

According to the current ETSI MEC ("Multi-Access Edge Computing"), the MEC host is seen to be stationary and can accordingly be connected via a highly reliable (e.g. fixed line) connection. However, in current or future deployments an MEC host may indeed not always be stationary, but mobile itself (e.g. in trains or busses). Then, the MEC host may not be connected via a reliable link. This again means that connection to specific entities like e.g. the MEC "mobile edge platform manager" may become unreliable. Current standards do not refer to such a situation where management commands and telemetry information can no longer be assumed to reach their destination unconditionally. A second problem arises from the fact that non-stationary hosts (NSH) may move from a first area of a first "mobile edge platform manager" (MEPM) to a second area served by a second (different) mobile edge platform manager.

There is a difference between managing a standard ETSI MEC host and platform that is in a fixed location connected via, e.g., a reliable fiber link, and an edge host and platform that run on a non-stationary infrastructure. In such a situation, the interface between the ETSI MEC mobile edge platform manager (Mm5) as well as the interface between ETSI MEC virtualization infrastructure manager and the virtualization infrastructure (Mm7 or Nf-Vi and Mv3 in case of a ETSI MEC in NFV deployment) may become unreliable, i.e., they use wireless rather than fixed networks. This means that management commands and telemetry information can no longer be assumed to reach their destination unconditionally. Currently, there is no mechanism in the standard to handle this uncertainty.

Some potential use cases for mobile edge computing are large vehicles with a need for hosting edge cloud functionality, such as busses, trains, airplanes, or ships. Even for smaller vehicles for individual traffic (i.e., cars) such functionality can be useful.

Furthermore, moving edge hosts may move out of a "mobility zone" of a mobile edge platform manager instance. This means that a mechanism may be needed to perform a handover between two distinct mobile edge platform managers.

SUMMARY

Now there has been invented an improved method and technical equipment implementing the method. In accordance with an embodiment, new entities or functions handling these issues are added. One entity monitors the availability of non-stationary hosts and, in case a non-stationary host cannot be reached, replies to requests in place of the non-stationary host. Another entity organizes a "handover" of a non-stationary host from a first mobile edge platform manager (MEPM) to a second mobile edge platform manager. As an example, these two elements may be called as a Non-Stationary Host Management Function and a Non-Stationary Host Orchestration Function in this specification. The Non-Stationary Host Management Function aims to mitigate effects of the wireless link that the management interface uses (intra-mobility zone movement). The wireless link is usually less than 100% reliable. The Non-Stationary Host Orchestration Function facilitates the movement of MEC hosts between mobility zones (inter-mobility zone movement).

Some aspects are related to the enablement of the MEC framework to manage non-stationary hosts by, for example, introducing a mechanism which provides information about the availability of MEC applications on non-stationary hosts including a mapping between application instances and non-stationary hosts; a mechanism for mitigation the effect of unreliable communication links on MEC interfaces using caching and delayed forwarding; and a mechanism for transitioning management of non-stationary hosts between MEC platform managers.

One target scenario is an edge cloud deployment in which one or more edge hosts are non-stationary, i.e., are located on vehicles within one edge cloud coverage zone managed by a single entity. Such zone is referred as a "mobility zone" in this specification.

Various aspects of examples of the invention are provided in the detailed description.

According to a first aspect, there is provided an apparatus comprising means for:
  wirelessly communicating with a non-stationary mobile edge computing element capable of providing mobile edge application services to wireless communication equipment;
  querying whether the non-stationary mobile edge computing element is available for mobile edge computing;
  maintaining information of the availability of the non-stationary mobile edge computing element for mobile edge computing; and maintaining information on mobile edge application instances the available non-stationary mobile edge computing element is providing.

A method according to a second aspect comprises:
  wirelessly communicating with a non-stationary mobile edge computing element capable of providing mobile edge application services to wireless communication equipment;
  querying whether the non-stationary mobile edge computing element is available for mobile edge computing;
  maintaining information of the availability of the non-stationary mobile edge computing element for mobile edge computing; and maintaining information on mobile edge application instances the available non-stationary mobile edge computing element is providing.

An apparatus according to a third aspect comprises at least one processor and at least one memory, said at least one memory stored with code thereon, which when executed by said at least one processor, causes the apparatus to perform at least:
  wirelessly communicate with a non-stationary mobile edge computing element capable of providing mobile edge application services to wireless communication equipment;
  query whether the non-stationary mobile edge computing element is available for mobile edge computing;
  maintain information of the availability of the non-stationary mobile edge computing element for mobile edge computing; and maintaining information on mobile edge application instances the available non-stationary mobile edge computing element is providing.

A computer readable storage medium according to a fourth aspect comprises code for use by an apparatus, which when executed by a processor, causes the apparatus to perform:
  wirelessly communicate with a non-stationary mobile edge computing element capable of providing mobile edge application services to wireless communication equipment;
  query whether the non-stationary mobile edge computing element is available for mobile edge computing;
  maintain information of the availability of the non-stationary mobile edge computing element for mobile edge computing; and maintaining information on mobile edge application instances the available non-stationary mobile edge computing element is providing.

An apparatus according to a fifth aspect comprises:
  a communication element configured to wirelessly communicate with a non-stationary mobile edge computing element capable of providing mobile edge application services to wireless communication equipment;
  a message composer configured to form a query whether the non-stationary mobile edge computing element is available for mobile edge computing;
  a memory configured to maintain information of the availability of the non-stationary mobile edge computing element for mobile edge computing; and maintaining information on mobile edge application instances the available non-stationary mobile edge computing element is providing.

According to a sixth aspect, there is provided an apparatus comprising means for:
  maintaining information of at least one mobile edge computing management apparatus;
  maintaining information of mobile edge computing instances provided by the at least one mobile edge computing management apparatus; and
  maintaining information of one or more cells of a wireless communication system which the mobile edge computing management apparatus uses for providing the mobile edge computing instances to wireless communication equipment.

A method according to a seventh aspect comprises:
  maintaining information of at least one mobile edge computing management apparatus;
  maintaining information of mobile edge computing instances provided by the at least one mobile edge computing management apparatus; and
  maintaining information of one or more cells of a wireless communication system which the mobile edge computing management apparatus uses for providing the mobile edge computing instances to wireless communication equipment.

An apparatus according to an eight aspect comprises at least one processor and at least one memory, said at least one memory stored with code thereon, which when executed by said at least one processor, causes the apparatus to perform at least:
  maintain information of at least one mobile edge computing management apparatus;
  maintain information of mobile edge computing instances provided by the at least one mobile edge computing management apparatus; and
  maintain information of one or more cells of a wireless communication system which the mobile edge computing management apparatus uses for providing the mobile edge computing instances to wireless communication equipment.

A computer readable storage medium according to a ninth aspect comprises code for use by an apparatus, which when executed by a processor, causes the apparatus to perform:
  maintain information of at least one mobile edge computing management apparatus;
  maintain information of mobile edge computing instances provided by the at least one mobile edge computing management apparatus; and
  maintain information of one or more cells of a wireless communication system which the mobile edge computing management apparatus uses for providing the mobile edge computing instances to wireless communication equipment.

An apparatus according to a tenth aspect comprises:
  a first database element configured to maintain information of at least one mobile edge computing management apparatus;
  a second database element configured to maintain information of mobile edge computing instances provided by the at least one mobile edge computing management apparatus; and
  a first database element maintain information of one or more cells of a wireless communication system which the mobile edge computing management apparatus uses for providing the mobile edge computing instances to wireless communication equipment.

BRIEF DESCRIPTION OF THE DRAWINGS

For a more complete understanding of example embodiments of the present invention, reference is now made to the following descriptions taken in connection with the accompanying drawings in which:

FIGS. 2a and 2b depict simplified signalling diagrams related to intra-mobility zone movement, in accordance with an embodiment;

FIG. 5a shows an example method as a flow diagram, in accordance with an embodiment;

FIG. 5b shows an example method as a flow diagram, in accordance with another embodiment;

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
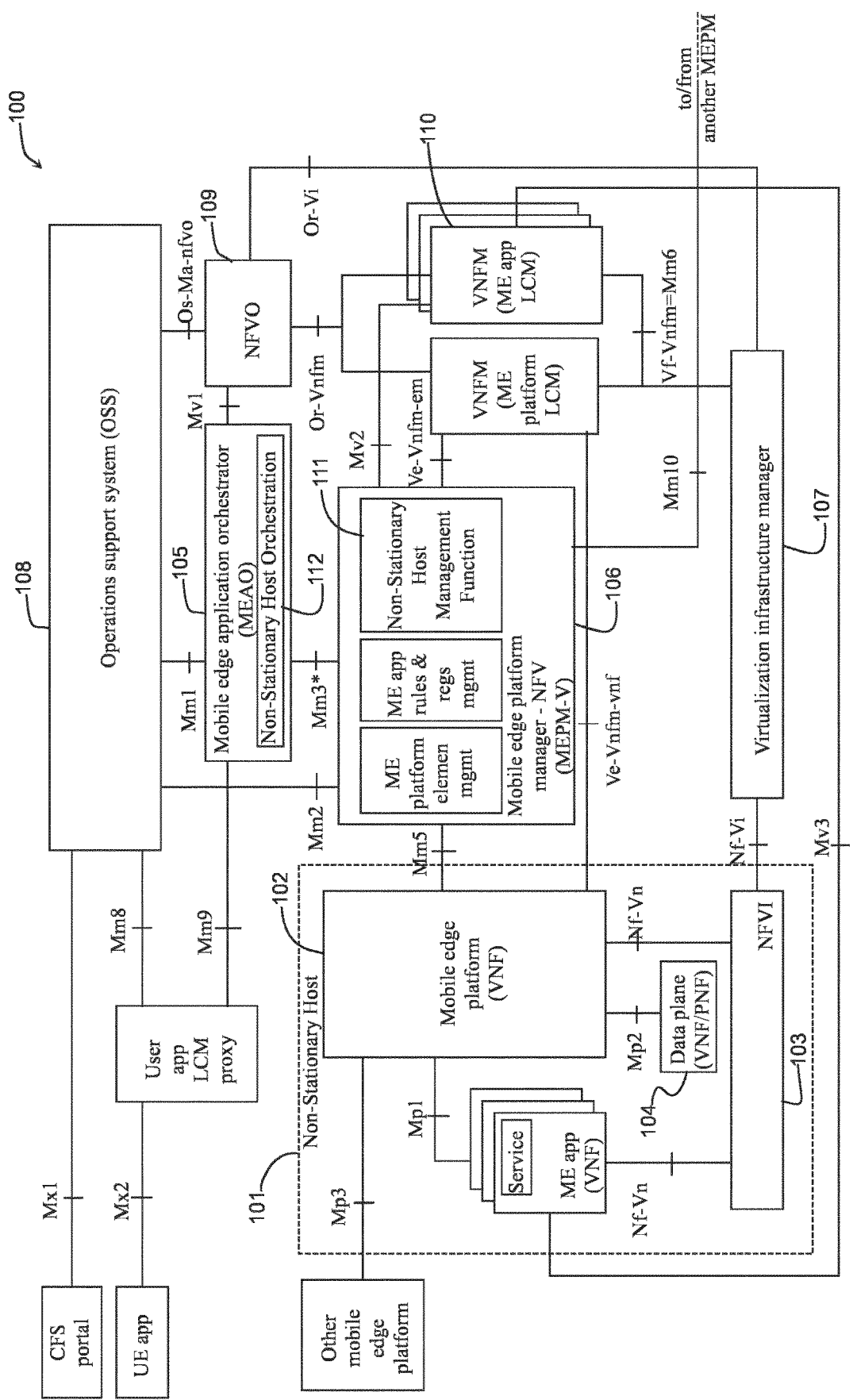
FIG. 1 shows a system for capturing, encoding, decoding, reconstructing and viewing a three-dimensional scheme.

In the following, some example embodiments are described which consider situations where one or more mobile edge hosts are able to move, i.e. are non-stationary. In accordance with an embodiment, two elements are provided for addressing challenges brought by the non-stationarity. An example is illustrated in FIG. 1 which depicts a mobile edge computing architecture in a network functions virtualization environment, based on the ETSI MEC in NFV architecture.

The mobile edge system 100 comprises mobile edge hosts 101 and mobile edge management 102 so that mobile edge applications can be run within an operator network or a subset of an operator network. The mobile edge host 101 is an entity that contains a mobile edge platform 102 and a virtualisation infrastructure 103 which provides computing, storage, and network resources, for the purpose of running mobile edge applications. The mobile edge platform 102 is a collection of functionalities which are used when mobile edge applications are run on a particular virtualisation infrastructure 103. These functionalities also enable the mobile edge applications to provide and consume mobile edge services. The mobile edge platform 102 can also provide services. The virtualisation infrastructure includes a data plane 104 that executes the traffic rules received by the mobile edge platform, and routes the traffic among applications, services, DNS server/proxy, 3GPP network, local networks and external networks.

Mobile edge applications can be instantiated on the virtualisation infrastructure 103 of the mobile edge host 101 based on configuration or requests validated by the mobile edge management. The mobile edge management comprises the mobile edge system level management and the mobile edge host level management.

The mobile edge system level management includes a mobile edge application orchestrator 105 as its core component, which has an overview of the complete mobile edge system. The mobile edge application orchestrator 105 may also be called as a mobile edge application orchestration element in this specification, The mobile edge host level management comprises a mobile edge platform manager 106 and a virtualisation infrastructure manager 107 (VIM), and handles the management of the mobile edge specific functionality of a particular mobile edge host 101 and the applications running on it.

The mobile edge platform 102 has, inter alia, the following functions. It offers an environment where the mobile edge applications can discover, advertise, consume and offer mobile edge services, including, when supported, mobile edge services available via other platforms. I also receives traffic rules from the mobile edge platform manager 106, applications, or services, and instructs the data plane accordingly. When supported, this includes the translation of tokens representing UEs in the traffic rules into specific IP addresses. The mobile edge platform 102 also receives DNS records from the mobile edge platform manager 106 and configures a DNS proxy/server accordingly. The mobile edge platform 102 may also host mobile edge services and provide access to persistent storage and time of day information.

Mobile edge applications can be run as virtual machines (VM) on top of the virtualisation infrastructure provided by the mobile edge host 101, and can interact with the mobile edge platform 102 to consume and provide mobile edge services. In certain cases, mobile edge applications may also interact with the mobile edge platform to perform certain support procedures related to the lifecycle of the application, such as indicating availability, preparing relocation of user state, etc.

Mobile edge applications can have a certain number of rules and requirements associated to them, such as required resources, maximum latency, required or useful services, etc. These requirements are validated by the mobile edge system level management, and can be assigned to default values if missing.

The mobile edge application orchestrator 106 (MEAO) is the core functionality in mobile edge system level management and is responsible inter alia for the following functions. The mobile edge application orchestrator 106 maintains an overall view of the mobile edge system based on deployed mobile edge hosts, available resources, available mobile edge services, and topology; takes case of on-boarding of application packages, including checking the integrity and authenticity of the packages, validating application rules and requirements and if necessary adjusting them to comply with operator policies, keeping a record of on-boarded packages, and preparing the virtualisation infrastructure manager(s) to handle the applications. The mobile edge application orchestrator 106 may further select appropriate mobile edge host(s) for application instantiation based on constraints, such as latency, available resources, and available services, as well as triggering application instantiation, termination, and/or relocation.

The Operations Support System (OSS) 108 in FIG. 1 refers to the operations support system of an operator. It receives requests via the CFS portal and from applications which are running in a user equipment (a.k.a. UE applications or user applications) for instantiation or termination of applications, and decides on the granting of these requests. Granted requests are forwarded to the mobile edge application orchestrator 105 for further processing.

When supported, the operations support system 108 also receives requests from UE applications for relocating applications between external clouds and the mobile edge system.

A user application is a mobile edge application that is instantiated in the mobile edge system in response to a request of a user via an application running in the user equipment such as a mobile communication device, a tablet computer, a laptop computer etc.

The mobile edge platform manager 106 manages the life cycle of applications including informing the mobile edge application orchestrator 105 of relevant application related events; provides element management functions to the mobile edge platform; and manages the application rules and requirements including service authorizations, traffic rules, DNS configuration and resolving conflicts.

The mobile edge platform manager 106 may also receive virtualised resources fault reports and performance measurements from the virtualisation infrastructure manager for further processing.

The virtualisation infrastructure manager 107 allocates, manages and releases virtualised (compute, storage and networking) resources of the virtualisation infrastructure, and prepares the virtualisation infrastructure to run a software image. The preparation may comprise configuring the infrastructure, and can also comprise receiving and storing the software image. The virtualisation infrastructure manager 107 may also collect and report performance and fault information about the virtualised resources; and may perform application relocation. For application relocation from/to external cloud environments, the virtualisation infrastructure manager interacts with the external cloud manager to perform the application relocation, possibly through a proxy.

A network functions virtualization orchestrator (NFVO) 109 has the ability to coordinate, authorize, release, and engage network functions virtualization infrastructure (NFVI) resources independently of any specific virtualization infrastructure manager 107. It also provides governance of virtualized network function (VNF) instances sharing resources of the network functions virtualization infrastructure. Resource orchestration is used, for example, to ensure there are adequate compute, storage, and network resources available to provide a network service. To meet that objective, the network functions virtualization orchestrator 109 can work either with the virtualisation infrastructure manager 107 or directly with network functions virtualization infrastructure resources, depending on the requirements.

User equipment applications as meant in the present specification are applications in the UE that have the capability to interact with the mobile edge system via a user application lifecycle management proxy.

FIG. 1 also depicts some so-called reference points between different entities of the architecture. In the following, the reference points are shortly described.

Reference points Mp1, MP2 and Mp3 relate to the mobile edge platform 102. The Mp1 reference point between the mobile edge platform and the mobile edge applications provides service registration, service discovery, and communication support for services. It also provides other functionality such as application availability, session state relocation support procedures, traffic rules and DNS rules activation, access to persistent storage and time of day information, etc. This reference point can be used for consuming and providing service specific functionality.

The Mp2 reference point between the mobile edge platform and the data plane of the virtualisation infrastructure is used to instruct the data plane on how to route traffic among applications, networks, services, etc.

The Mp3 reference point between mobile edge platforms is used for control communication between mobile edge platforms.

Reference points Mm1 to Mm10 relate to the mobile edge management.

The Mm1 reference point between the mobile edge application orchestrator 105 and the operations support system 108 is used for triggering the instantiation and the termination of mobile edge applications in the mobile edge system.

The Mm2 reference point between the operations support system 108 and the mobile edge platform manager is used for the mobile edge platform configuration, fault and performance management.

The Mm3 reference point between the mobile edge application orchestrator 105 and the mobile edge platform manager is used for the management of the application lifecycle, application rules and requirements and keeping track of available mobile edge services.

The Mm4 reference point between the mobile edge application orchestrator 105 and the virtualisation infrastructure manager is used to manage virtualised resources of the mobile edge host, including keeping track of available resource capacity, and to manage application images.

The Mm5 reference point between the mobile edge platform manager and the mobile edge platform is used to perform platform configuration, configuration of the application rules and requirements, application lifecycle support procedures, management of application relocation, etc.

The Mm6 reference point between the mobile edge platform manager and the virtualisation infrastructure manager is used to manage virtualised resources e.g. to realize the application lifecycle management.

The Mm7 reference point between the virtualisation infrastructure manager and the virtualisation infrastructure is used to manage the virtualisation infrastructure.

The Mm8 reference point between the user application lifecycle management proxy and the operations support system 108 is used to handle UE applications requests for running applications in the mobile edge system.

The Mm9 reference point between the user application lifecycle management proxy and the mobile edge application orchestrator 105 of the mobile edge system is used to manage mobile edge applications requested by UE application.

The Mm10 reference point between multiple mobile edge platform managers is used to facilitate transition of non-stationary hosts between different mobile edge platform managers.

In the following, reference points Mx1, Mx2 related to external entities will be shortly described.

The Mx1 reference point between the operations support system 108 and the customer facing service portal is used by the third-parties to request the mobile edge system to run applications in the mobile edge system. This reference point is not further specified.

The Mx2 reference point between the user application lifecycle management proxy and the UE application is used by a UE application to request the mobile edge system to run an application in the mobile edge system, or to move an application in or out of the mobile edge system. This reference point is only accessible within the mobile network. It may only be available when supported by the mobile edge system.

A mobile edge service is a service provided and consumed either by the mobile edge platform or a mobile edge application. When provided by an application, it can be registered in a list of services to the mobile edge platform over the Mp1 reference point. A mobile edge application can subscribe to a service for which it is authorized over the Mp1 reference point. A certain number of mobile edge services may be necessary in order to fulfil the requirements defined in ETSI GS MEC 002.

A Radio Network Information service, when available, provides authorized applications with radio network related information. It exposes information to applications, such as appropriate up-to-date radio network information regarding radio network conditions; measurement and statistics information related to the user plane; information (e.g. UE context and radio access bearers) related to UEs served by the radio node(s) associated with the mobile edge host; and changes on information related to UEs served by the radio node(s) associated with the mobile edge host. The radio network information is provided at the relevant granularity (e.g. per User Equipment (UE) or per cell, per period of time).

The reference points Mv1, Mv2 and Mv3 are introduced to support the management of ME applications running as virtualised network functions.

The reference point Mv1 connects the mobile edge application orchestrator 106 and a network functions virtualization orchestrator 109. It is related to the Os-Ma-nfvo reference point.

The reference point Mv2 connects the virtualized network function manager (VNFM) 110 that performs the life cycle management (LCM) of the ME app virtualized network functions with the MEPM-V to allow life cycle management related notifications to be exchanged between these entities. It is related to the Ve-Vnfm-em reference point, but will possibly include additions, and might not use all functionality offered by Ve-Vnfm-em.

The reference point Mv3 connects the virtualized network functions manager 110 with the ME app virtualized network function instance, to allow the exchange of messages e.g. related to ME application life cycle management or initial deployment-specific configuration. It is related to the Ve-Vnfm-vnf reference point, but will possibly include additions, and might not use all functionality offered by Ve-Vnfm-vnf.

The reference point Nf-Vn connects each ME app virtualized network function with the network functions virtualization infrastructure.

The reference point Nf-Vi connects the network functions virtualization infrastructure and the virtualisation infrastructure manager 107.

The reference point Os-Ma-nfvo connects the operations support system 108 and the network functions virtualization orchestrator 109. It is primarily used to manage NSs, i.e. a number of virtualized network functions connected and orchestrated to deliver a service.

The reference point Or-Vnfm connects the network functions virtualization orchestrator 109 and the virtualized network function manager 110. It is primarily used for the network functions virtualization orchestrator 109 to invoke virtualized network function life cycle management operations.

The reference point Vi-Vnfm connects the virtualisation infrastructure manager 107 and the virtualized network function manager 110. It is primarily used by the virtualized network function manager 110 to invoke resource management operations to manage the cloud resources that are needed by the virtualized network function. It is assumed in a NFV-based MEC deployment that this reference point corresponds to Mm6.

The reference point Or-Vi connects the network functions virtualization orchestrator 109 and the virtualisation infrastructure manager 107. It is primarily used by the network functions virtualization orchestrator 109 to manage cloud resources capacity.

In order to run a mobile edge application in the mobile edge system, the mobile edge application orchestrator 105 receives requests triggered by the operations support system 108, a third-party, or a UE application.

These requests provide information about the application to run, and possibly other information, such as the location where the application needs to be active, other application rules and requirements, as well as the location of the application image if it is not yet on-boarded in the mobile edge system.

The information considered by the mobile edge application orchestrator 105 when selecting a mobile edge host(s) for a mobile edge application can include:
  deployment model of the application (e.g. whether it is one instance per user, one instance per host, one instance on each host, etc.);
  required virtualised resources (compute, storage, network resources, including specific hardware support);
  latency requirements (e.g. how strict the latency constraints are, latency fairness between users);
  requirements on location;
  required mobile edge services that are needed for the mobile edge application to be able to run;
  mobile edge services that the mobile edge application can take advantage of if available;
  connectivity or mobility requirements (e.g. application state relocation, application instance relocation);
  required mobile edge features, such as VM relocation support or UE identity;
  required network connectivity (e.g. connectivity to applications within the mobile edge system, connectivity to local networks, or to the Internet);
  information on the operator's mobile edge system deployment or mobile network deployment (e.g. topology, cost);
  requirements on access to user traffic;
  requirements on persistent storage.

The mobile edge application orchestrator 105 considers the requirements and information listed above and information on the resources currently available in the mobile edge system to select one or several mobile edge hosts within the mobile edge system, and requests the selected host(s) to instantiate the application.

Under certain circumstances (e.g. UE mobility events resulting in increased latency, load balancing decisions), and if supported, the mobile edge application orchestrator 105 could decide to select a new host and initiate the transfer of an application instance or application-related state information from a source host (S-MEPM) to a target host (T-MEPM).

The mobile edge platform provides access to a domain name system (DNS), which includes a name server and a proxy/cache function. The mobile edge platform receives the application DNS rules from the mobile edge management. Based on configuration or following an activation request from the mobile edge application, the mobile edge platform configures the mapping between an IP address and its FQDN into the DNS based on these rules.

In the following, the operation of a method related to the management of the non-stationary host 102 in some example situations will be described in more detail with reference to the signalling diagrams of FIGS. 2a, 2b and 2c.

FIG. 2a depicts a simplified signalling diagram regarding intra-mobility zone movement, in accordance with an embodiment.

A "Non-Stationary Host Management Function (NSH-MF)" 111, which may also be called as a non-stationary host management element in this specification, is introduced to mitigate the effects of the unreliable (wireless) interfaces on non-stationary hosts 101 (NSH). The non-stationary host management function 111 can be part of the mobile edge platform manager 106 (MEPM(-V)) but could also be stand-alone. The non-stationary host management function 111 provides the mapping of a specific application instance represented through its Application Instance Identifier to the Mobile Edge Platform Instance it is associated with. In accordance with an embodiment, a non-stationary host 101 shall only host one Mobile Edge Instance.

The functionality of the non-stationary host management function 111 is responsible, inter alia, for the following tasks:

The non-stationary host management function 111 provides information about the non-stationary host 101, the MEC platform it hosts, as well as the host applications to other management and orchestration functions in the MEC framework. The non-stationary host management function 111 answers requests regarding the availability of the non-stationary host 101 on which a specific application instance is hosted after having resolved the Application Instance Identifier to the corresponding MEP Instance and Non-Stationary Host.

In the signalling diagram of FIG. 2a the mobile edge application orchestrator 105 queries whether a current application instance is available. The mobile edge application orchestrator 105 sends a request message 201 via the Mm3 interface to the non-stationary host management function 111. The request message 201 comprises information of the application instance to which the query relates. The information may be, for example, an application instance identifier. If the current application instance is available, the non-stationary host management function 111 replies to the request by sending 202 via the Mm3 interface a positive acknowledgement (yes) to the mobile edge application orchestrator 105. If the current application instance is not available, the non-stationary host management function 111 replies to the request by sending 202 via the Mm3 interface a negative acknowledgement (no) to the mobile edge application orchestrator 105.

In the signalling diagram of FIG. 2b the mobile edge application orchestrator 105 queries from the non-stationary host management function 111 when a next application instance might be available. The mobile edge application orchestrator 105 sends a request message 203 via the Mm3 interface to the non-stationary host management function 111. The request message 203 comprises information of the application instance to which the query relates. The information may be, for example, an application instance identifier. The non-stationary host management function 111 replies to the query by sending indication 204 of a time interval to the next predicted application instance availability via the Mm3 interface.

The non-stationary host management function 111 may also serve as a message proxy towards the platform/host/infrastructure. If the addressed moving entity is available/responsive, it simply forwards the message. If the addressed moving entity is unavailable, depending on the configuration the non-stationary host management function 111 either responds with a negative acknowledgement or it acknowledges the message and caches it until the addressed moving entity becomes available again.

Figure 2C:
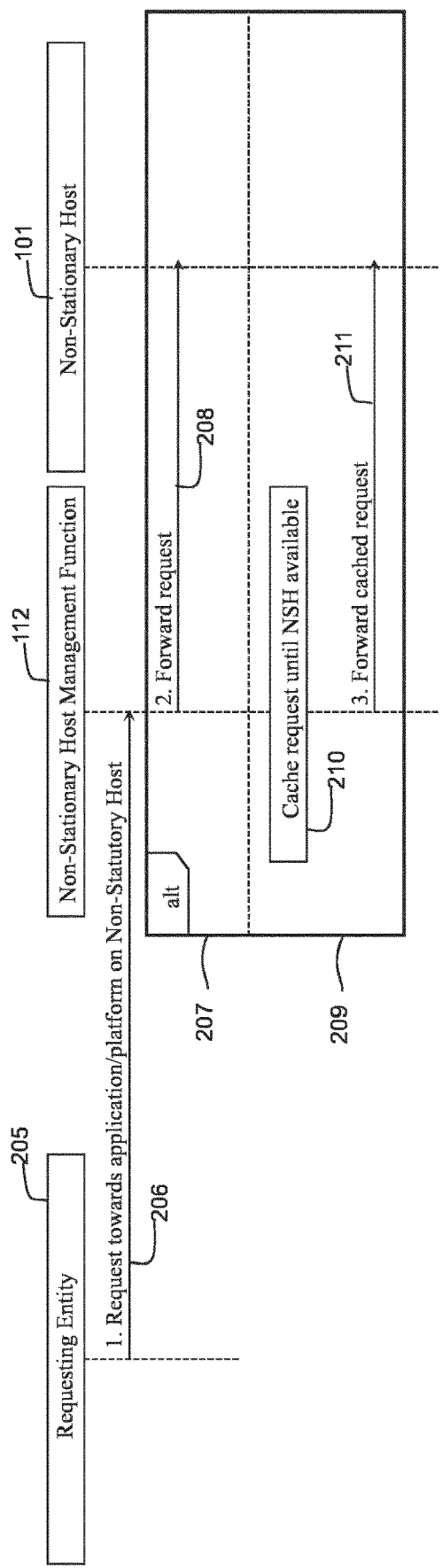
FIG. 2c depicts a simplified signalling diagram related to a situation in which a non-stationary host management function operates as a message proxy towards a platform/host/infrastructure, in accordance with an embodiment.

FIG. 2c depicts a simplified signalling diagram regarding message delivery between a requesting entity 205 and a non-stationary host 101, in accordance with an embodiment. The requesting entity 205 sends a request 206 towards an application/platform on the non-stationary host 101. The request is received by the non-stationary host management function 112 which manages the requested non-stationary host 101. In the example of FIG. 2c there are two alternatives how the process may proceed. In the first alternative 207, the requested non-stationary host 101 is available, wherein the non-stationary host management function 112 forwards 208 the request to the non-stationary host 101. In the other alternative 209 the requested non-stationary host 101 is not available, wherein the non-stationary host management function 112 caches 210 the request until the non-stationary host 101 is available. Hence, when the non-stationary host 101 is available, the non-stationary host management function 112 forwards 211 the cached request to the non-stationary host 101.

FIG. 5a illustrates some details of the operation of the non-stationary host management function 111 as a simplified flow diagram, in accordance with an embodiment. The non-stationary host management function 111 wirelessly communicates with a non-stationary host 101 (block 502 in FIG. 5a). The non-stationary host management function 111 queries (504) from the non-stationary host 101 whether the non-stationary host 101 is available for mobile edge computing. The non-stationary host management function 111 maintains (506) information of the availability of the non-stationary host 101 and also maintains (508) information on mobile edge application instances the available non-stationary host 101 is providing.

A "Non-Stationary Host Orchestration Function (NSH-OF)" 112 is introduced to handle the transition of non-stationary hosts 101 between mobility zones. The non-stationary host orchestration function 112 can be realized as an internal function of mobile edge (application) orchestrator (ME(A)O) but also as a stand-alone function.

The functionality of the non-stationary host orchestration function 112 includes but is not limited to the proactive preparation of MEC/NFV components and connectivity in the target mobility zone the moving entity is entering as well as the tear down of the same in the mobility zone the moving entity is leaving once the handover is complete.

The non-stationary host orchestration function 112 may leverage movement prediction as well as rely on dual connectivity to facilitate a smooth mobility zone transition.

The mobile edge platform 102 on the non-stationary host 101 comprises an Instance Identifier so that the non-stationary host orchestration function 112 can use it to reference a specific mobile edge platform instance as a mobile edge platform manager 106 may manage several mobile edge platforms 102. Furthermore, an interface between multiple mobile edge platform managers 106 may be needed to facilitate the transition of non-stationary hosts 101 between mobile edge platform managers 106. This interface is named as Mm10 in this specification.

The process could alternatively be directed via the mobile edge application orchestrator 105.

Figure 3:
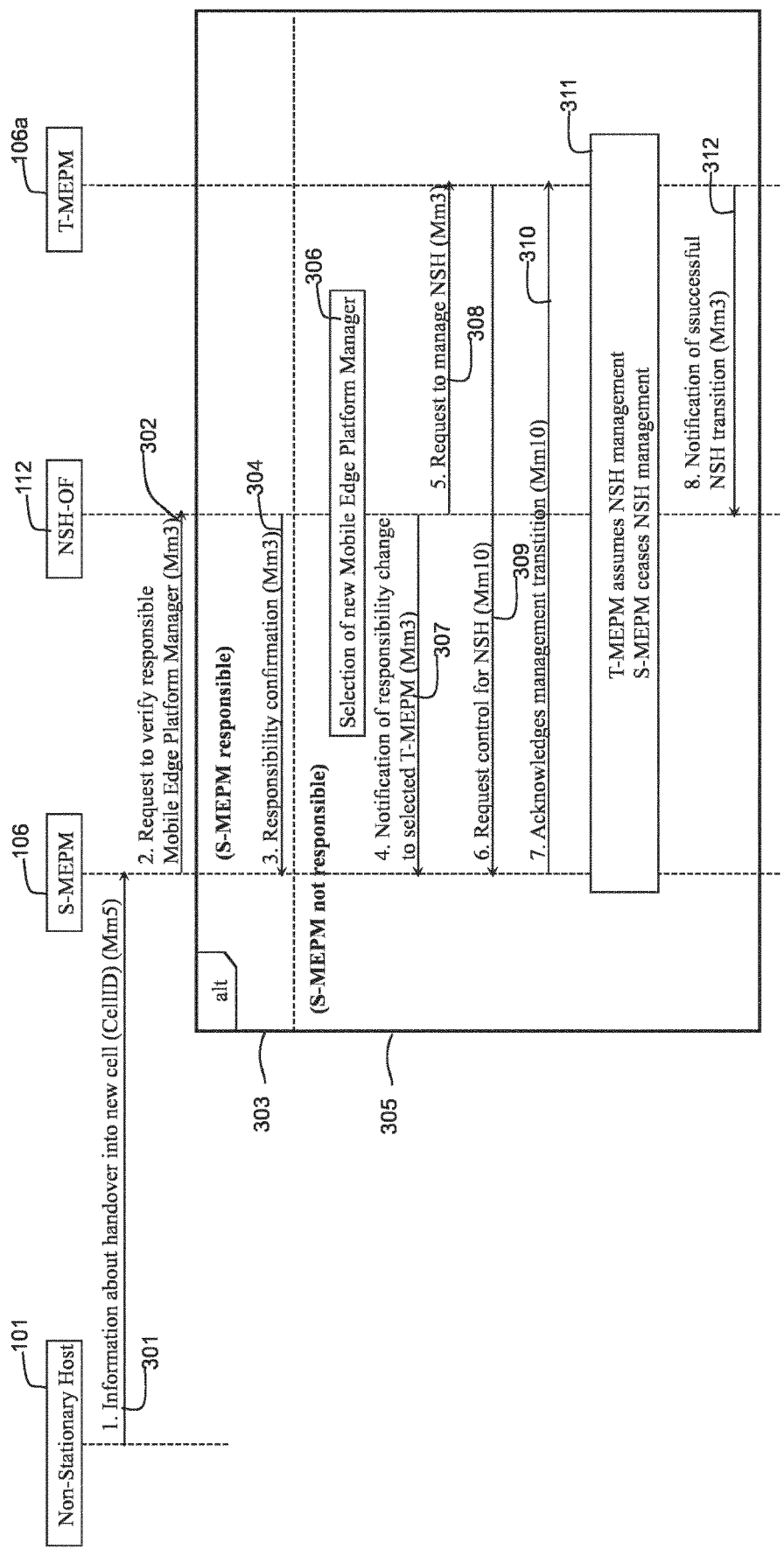
FIG. 3 depicts a simplified signalling diagram related to inter-mobility zone movement, in accordance with an embodiment.

FIG. 3 depicts a simplified signalling diagram regarding inter-mobility zone movement, in accordance with an embodiment. When a non-stationary host 101 detects that it is making a handover from a previous cell to a new cell of a wireless communication network, the non-stationary hosts 101 obtains information about the identity of the new cell (CellID) and sends a message 301 to the mobile edge platform manager 106 which is currently serving the non-stationary host 101. The message comprises information about the handover into the new cell, including information of the identity CellID of the new cell. The mobile edge platform manager 106 sends a request 302 to the non-stationary host orchestration function 112 to verify the responsible mobile edge platform manager 106.

Figure 4A:
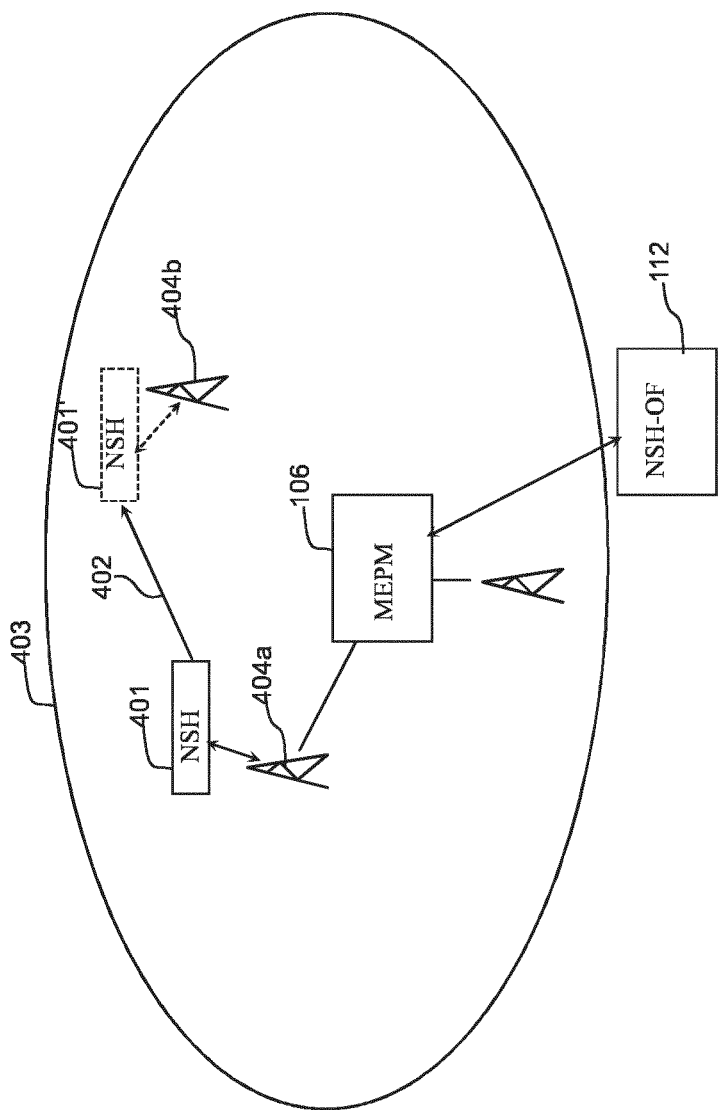
FIG. 4a illustrates an example of a situation in which a non-stationary host moves to a serving area of another cell, which belongs to the management of the same mobile edge platform manager than a previous one.

How the process proceeds depends on whether the new cell belongs to the responsibility of the current mobile edge platform manager 106 or not. If the responsibility of the new cell belongs to the current mobile edge platform manager 106 (alternative 303 in FIG. 3), the non-stationary host orchestration function 112 replies by sending a responsibility confirmation message 304 to the current mobile edge platform manager 106. An example of this kind of situation is illustrated in FIG. 4a.

A vehicle 401 carrying the non-stationary host 101 (NSH) moves to a new location (illustrated with the arrow 402 and the dashed rectangle 401'). The non-stationary host 101 is communicating with the wireless communication network 403 via a first access point 404a, e.g. a base station of the wireless communication network. This base station can also be called as a serving base station. During the movement the serving base station may change, wherein the non-stationary host 101 may try to find out whether also the mobile edge platform manager 106 has changed due to the new serving base station 404b.

If the responsibility of the new cell does not belong to the current mobile edge platform manager 106 (alternative 305 in FIG. 3), the non-stationary host orchestration function 112 selects 306 a new mobile edge platform manager 106a which is responsible of the new cell. Then, the non-stationary host orchestration function 112 sends a notification 307 of responsibility change to the current mobile edge platform manager 106. The notification 307 comprises indication of the selected mobile edge platform manager 106a. The non-stationary host orchestration function 112 also sends to the selected mobile edge platform manager 106a a request 308 to manage the non-stationary host. The request 308 may be sent via the Mm3 interface. When the selected mobile edge platform manager 106a has processed the request 308 it sends a request 309 to the current mobile edge platform manager 106 to take control for the non-stationary host 101 from the current mobile edge platform manager 106. The current mobile edge platform manager 106 replies 310 by sending an acknowledgement 310 of management transition to the selected mobile edge platform manager 106a. Both the request 309 and the acknowledgement 310 may be sent via the interface Mm10. Then, the selected mobile edge platform manager 106a assumes that it has the management over the non-stationary host 101 and the current mobile edge platform manager 106 ceases to manage the non-stationary host 101. Additionally, the non-stationary host orchestration function 112 takes measures to ensure connectivity to the non-stationary host 101 now associated to the mobile edge platform manager (T-MEPM) by instructing corresponding network management or control entities. This is illustrated with block 311 in FIG. 3. The selected mobile edge platform manager 106a may also send a notification 312 of successful non-stationary host management transition to the non-stationary host orchestration function 112 via the interface Mm3. Finally, in case that the mobile edge computing platform is managed by a network functions virtualization infrastructure (cf. FIG. 1), the mobile edge platform as well as the mobile edge applications on the non-stationary host 101 may need to re-associate with the corresponding virtualized network function managers 110.

Figure 4B:
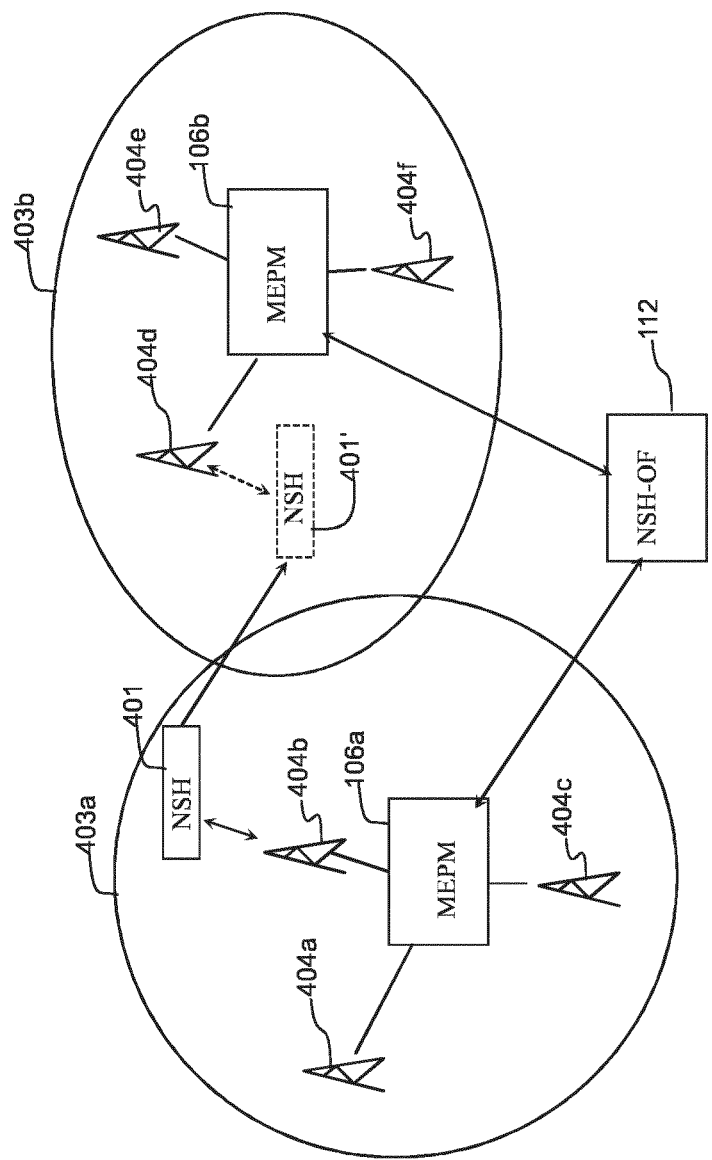
FIG. 4b illustrates an example of a situation in which a non-stationary host moves to a serving area of another cell, which belongs to the management of a different mobile edge platform manager than a previous one.

An example of the latter situation is illustrated in FIG. 4b. A vehicle 401 carrying the non-stationary host 101 (NSH) moves to a new location (illustrated with the arrow 402 and the dashed rectangle 401'). The non-stationary host 101 is communicating with the wireless communication network 403a via a first access point 404a, e.g. a base station of the wireless communication network 403a. During the movement the serving base station may change, wherein the non-stationary host 101 may try to find out whether also the mobile edge platform manager 106a has changed due to the new serving base station 404d. In this example, also the mobile edge platform manager 106 has changed so that the new base station 404d belongs to a second mobile edge platform manager 106b.

The non-stationary host 101 may be installed in connection with a vehicle such as a train, a bus, a tram, an airplane or it may also be a car, for example. On board user equipment UE may utilize mobile edge services via the non-stationary host to run applications, perform calculations at least partly in or via the mobile edge platform manager 106, FIG. 5b illustrates some details of the operation of the non-stationary host orchestration function 112 as a simplified flow diagram, in accordance with an embodiment. The non-stationary host orchestration function 112 maintains (522) information of at least one mobile edge computing management apparatus. The non-stationary host orchestration function 112 also maintains (524) information of mobile edge computing instances provided by the at least one mobile edge computing management apparatus; and maintains (526) information of one or more cells of a wireless communication system which the mobile edge computing management apparatus uses for providing the mobile edge computing instances to wireless communication equipment.

In the following, an access architecture to which some embodiments may be applied will be described using as an example a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 6:
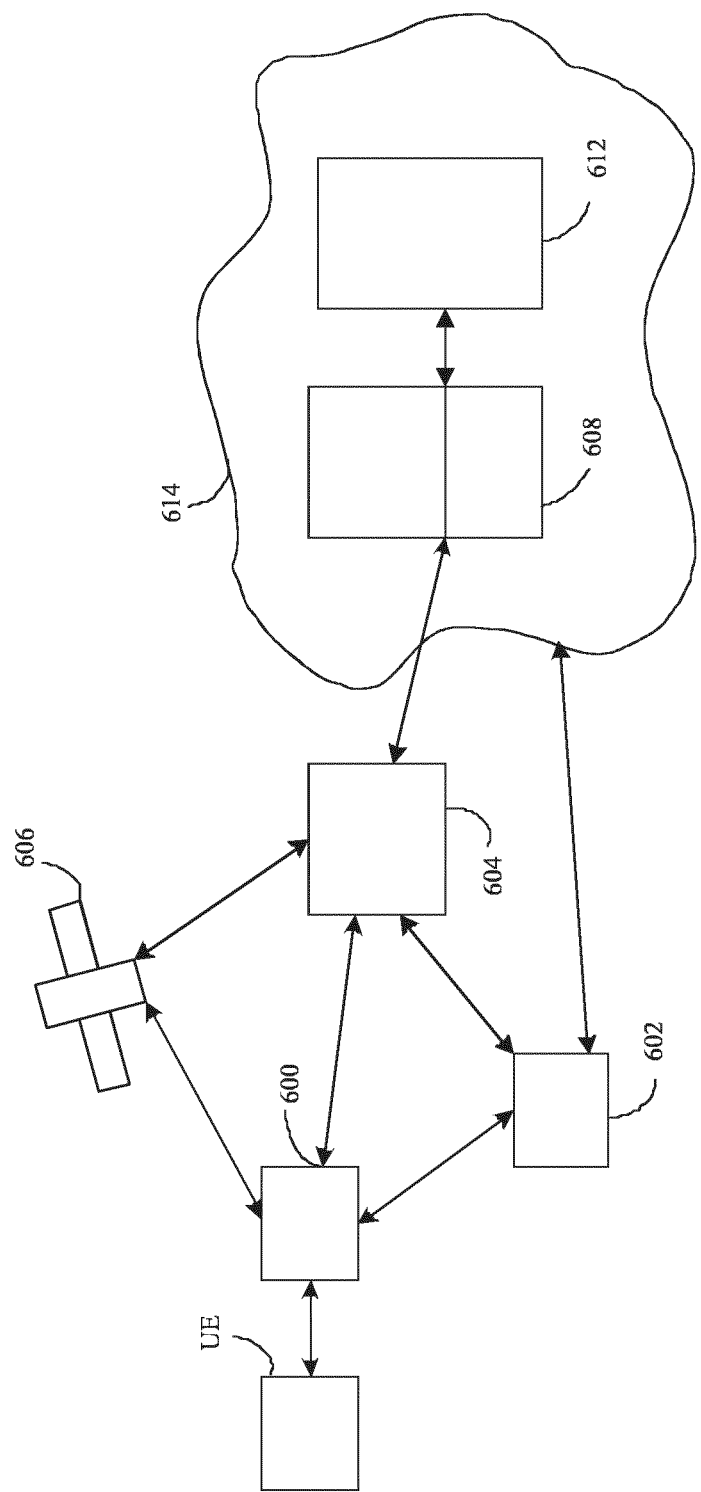
FIG. 6 shows a part of an exemplifying radio access network.

FIG. 6 depicts examples of simplified system architectures only showing some elements and functional entities, all being logical units, whose implementation may differ from what is shown. The connections shown in FIG. 6 are logical connections; the actual physical connections may be different. It is apparent to a person skilled in the art that the system typically comprises also other functions and structures than those shown in FIG. 6.

The embodiments are not, however, restricted to the system given as an example but a person skilled in the art may apply the solution to other communication systems provided with necessary properties.

The example of FIG. 6 shows a part of an exemplifying radio access network.

FIG. 6 shows user devices 600 and 602 configured to be in a wireless connection on one or more communication channels in a cell with an access node (such as (e/g)NodeB) 604 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 610 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 6) may be implemented.

5G enables using multiple input multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 612, or utilise services provided by them. The communication network may also be able to support the usage of cloud services, for example at least part of core network operations may be carried out as a cloud service (this is depicted in FIG. 6 by "cloud" 614). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 604) and non-real time functions being carried out in a centralized manner (in a centralized unit, CU 608).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular megaconstellations (systems in which hundreds of (nano)satellites are deployed). Each satellite 606 in the mega-constellation may cover several satellite-enabled network entities that create on-ground cells. The on-ground cells may be created through an on-ground relay node 604 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 6 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 6). A HNB Gateway (HNB-GW), which is typically installed within an operator's network may aggregate traffic from a large number of HNBs back to a core network.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules.

Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus, comprising:
   at least one processor; and
   at least one memory comprising computer program code,
   the at least one memory and computer program code configured, with the at least one processor, to cause the apparatus at least to:
   communicate wirelessly with a non-stationary mobile edge computing element capable of providing mobile edge application services to wireless communication equipment;
   query whether the non-stationary mobile edge computing element is available for mobile edge computing;
   maintain information of the availability of the non-stationary mobile edge computing element for mobile edge computing;
   maintain information on mobile edge application instances the available non-stationary mobile edge computing element is providing;

obtain information about an identity of a cell of a wireless communication network currently serving the non-stationary mobile edge computing element;

compare the identity of the currently serving cell with an identity of a cell which was previously serving the non-stationary mobile edge computing element; and communicate with a non-stationary host orchestration element, which leverages movement prediction and relies on dual connectivity to facilitate a smooth mobility zone transition, to determine whether the apparatus is to release control for the non-stationary mobile edge computing element to another apparatus.

2. The apparatus according to claim 1, wherein the at least one memory and computer program code are further configured, with the at least one processor, to cause the apparatus at least to:

receive a query whether an application instance is available;

examine a status of the application instance; and send a reply to the query indicative of whether the application instance is available.

3. The apparatus according to claim 1, wherein the at least one memory and computer program code are further configured, with the at least one processor, to cause the apparatus at least to:

receive a query requesting when an application instance becomes available;

examine a status of the application instance; and send a reply to the query comprising an indication of a next predicted application instance availability, wherein the next predicted application instance availability is obtained by leveraging the movement prediction.

4. The apparatus according to claim 1, wherein the at least one memory and computer program code are further configured, with the at least one processor, to cause the apparatus at least to:

receive a message proxy addressed to a non-stationary computing element;

examine whether the non-stationary computing element is available; and forward the message proxy to the non-stationary computing element, upon the examination indicating that the non-stationary computing element is available.

5. The apparatus according to claim 4, wherein the at least one memory and computer program code are further configured, with the at least one processor, to cause the apparatus at least to perform, upon the examination indicating that the non-stationary computing element is not available at present, at least one of the following:

cache the message proxy, and forward the cached message proxy to the non-stationary computing element, when the non-stationary computing element becomes available;

reply with a negative acknowledgment.

6. A method comprising:

wirelessly communicating with a non-stationary mobile edge computing element capable of providing mobile edge application services to wireless communication equipment;

querying whether the non-stationary mobile edge computing element is available for mobile edge computing;

maintaining information of the availability of the non-stationary mobile edge computing element for mobile edge computing;

maintaining information on mobile edge application instances the available non-stationary mobile edge computing element is providing;

obtaining information about an identity of a cell of a wireless communication network currently serving the non-stationary mobile edge computing element;

comparing the identity of the currently serving cell with an identity of a cell which was previously serving the non-stationary mobile edge computing element; and communicating with a non-stationary host orchestration element, which leverages movement prediction and relies on dual connectivity to facilitate a smooth mobility zone transition, to determine whether to release control for the non-stationary mobile edge computing element to another apparatus.

7. The method according to claim 6 further comprising:

receiving query whether an application instance is available;

examining a status of the application instance; and sending a reply to the query indicative of whether the application instance is available.

8. The method according to claim 6, further comprising:

receiving a query requesting when an application instance becomes available;

examining a status of the application instance; and sending a reply to the query comprising an indication of a next predicted application instance availability, wherein the next predicted application instance availability is obtained by leveraging the movement prediction.

9. The method according to claim 6, further comprising:

receiving a message proxy addressed to a non-stationary computing element;

examining whether the non-stationary computing element is available; and forwarding the message proxy to the non-stationary computing element, upon the examination indicating that the non-stationary computing element is available.

10. The method according to claim 9 further comprising:

caching the message proxy, and forward the cached message proxy to the non-stationary computing element, when the non-stationary computing element becomes available, upon the examination indicating that the non-stationary computing element is not available at present; and replying with a negative acknowledgment.

11. An apparatus, comprising:

at least one processor; and at least on memory comprising computer program code, the at least one memory and computer program code configured, with the at least one processor, to cause the apparatus at least to:

maintain information of at least one mobile edge computing management apparatus;

maintain information of mobile edge computing instances provided by the at least one mobile edge computing management apparatus;

maintain information of one or more cells of a wireless communication system which the at least one mobile edge computing management apparatus uses for providing the mobile edge computing instances to wireless communication equipment;

receive from a non-stationary computing element an indication of a cell of a wireless communication network;

examine the indication to determine which mobile edge computing management apparatus uses the indicated cell for providing the mobile edge computing instances to wireless communication equipment;

receive from a non-stationary host orchestration function, which leverages movement prediction and relies on dual connectivity to facilitate a smooth mobility zone transition, an indication of a selected mobile edge platform manager;

receive from the selected mobile edge platform manager a request to take control for the non-stationary computing element from the mobile edge computing management apparatus;

send an acknowledgement of management transition to the selected mobile edge platform manager; and perform a handover operation, upon the examination indicating that the determined mobile edge computing management apparatus is different from a mobile edge computing management apparatus previously used for providing the mobile edge computing instances to the wireless communication equipment.

12. The apparatus according to claim 11, wherein the at least one memory and computer program code are further configured, with the at least one processor, to cause the apparatus at least to:

obtain information of a mobile edge computing management apparatus whether the apparatus is configured to provide mobile edge computing services via the indicated cell; and upon the obtained information indicating that the apparatus is not configured to provide mobile edge computing services via the indicated cell, perform a responsibility change operation with another apparatus.

13. A method, comprising:

maintaining information of at least one mobile edge computing management apparatus;

maintaining information of mobile edge computing instances provided by the at least one mobile edge computing management apparatus;

maintaining information of one or more cells of a wireless communication system which the at least one mobile edge computing management apparatus uses for providing the mobile edge computing instances to wireless communication equipment;

receiving from a non-stationary computing element an indication of a cell of a wireless communication network;

examining the indication to determine which mobile edge computing management apparatus uses the indicated cell for providing the mobile edge computing instances to wireless communication equipment;

receiving from a non-stationary host orchestration function, which leverages movement prediction and relies on dual connectivity to facilitate a smooth mobility zone transition, an indication of a selected mobile edge platform manager;

receiving from the selected mobile edge platform manager a request to take control for the non-stationary computing element from the mobile edge computing management apparatus;

sending an acknowledgement of management transition to the selected mobile edge platform manager; and performing a handover operation, upon the examination indicating that the determined mobile edge computing management apparatus is different from a mobile edge computing management apparatus previously used for providing the mobile edge computing instances to the wireless communication equipment.

14. The method according to claim 13, further comprising:

obtaining information of a mobile edge computing management apparatus whether the apparatus is configured to provide mobile edge computing services via the indicated cell; and upon the obtained information indicating that the apparatus is not configured to provide mobile edge computing services via the indicated cell, performing a responsibility change operation with another apparatus.

* * * * *